US009584354B2

(12) United States Patent
Martinez

(10) Patent No.: US 9,584,354 B2
(45) Date of Patent: Feb. 28, 2017

(54) RADIO SIGNAL DECODING AND DECODER

(71) Applicant: Vincent Martinez, Castres (FR)

(72) Inventor: Vincent Martinez, Castres (FR)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 14/899,516

(22) PCT Filed: Jul. 1, 2013

(86) PCT No.: PCT/IB2013/001610
§ 371 (c)(1),
(2) Date: Dec. 17, 2015

(87) PCT Pub. No.: WO2015/001369
PCT Pub. Date: Jan. 8, 2015

(65) Prior Publication Data
US 2016/0156492 A1    Jun. 2, 2016

(51) Int. Cl.
*H04L 27/06* (2006.01)
*H04L 27/26* (2006.01)
(Continued)

(52) U.S. Cl.
CPC ........ *H04L 27/265* (2013.01); *H04L 27/2666* (2013.01); *H04W 72/0413* (2013.01); *H04W 74/0833* (2013.01)

(58) Field of Classification Search
CPC ............. H04L 27/265; H04L 27/2666; H04W 74/0833; H04W 72/0413
See application file for complete search history.

(56) References Cited

U.S. PATENT DOCUMENTS

| 8,320,433 B2 | 11/2012 | Wegener | |
| 2006/0256884 A1* | 11/2006 | Tomioka | H04B 1/71637 375/260 |

(Continued)

FOREIGN PATENT DOCUMENTS

| EP | 1811691 B1 | 3/2012 | |
| JP | WO 2013061716 A1 * | 5/2013 | .......... H04W 52/365 |
| WO | 2012109127 A1 | 8/2012 | |

OTHER PUBLICATIONS

International Search Report and Written Opinion correlating to PCT/IB2013/001610 issued on Mar. 19, 2013.

(Continued)

*Primary Examiner* — Syed Haider

(57) ABSTRACT

A radio signal decoder comprises a receiver configured to receive a digitized radio signal having modulated subcarrier frequencies encoding digital information, a first set of the subcarrier frequencies having a first subcarrier spacing, a second set of the subcarrier frequencies having a second subcarrier spacing, a first transformer configured to transform the digitized radio signal from a time domain into a frequency domain, the transformer being configured with the first subcarrier spacing, a first decoder configured to reconstruct digital information from the output of the first transformer, and an inverse transformer configured to to transform the input from the frequency domain back to the time domain with the first subcarrier spacing, a second transformer configured to transform the output of inverse transformer from the time domain to a frequency domain with the second subcarrier spacing, and a second decoder reconstructing digital information from the output of the second transformer.

20 Claims, 10 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 2010/0246711 A1* | 9/2010 | Kishigami | H04L 5/0039 |
| | | | 375/295 |
| 2011/0249548 A1 | 10/2011 | Gaal et al. | |
| 2012/0188961 A1 | 7/2012 | Suzuki et al. | |
| 2012/0307743 A1* | 12/2012 | McGowan | H04L 27/265 |
| | | | 370/329 |
| 2013/0114574 A1 | 5/2013 | Ng et al. | |
| 2013/0165122 A1* | 6/2013 | Tanaka | H04B 7/024 |
| | | | 455/436 |
| 2014/0329553 A1* | 11/2014 | Nakashima | H04W 52/365 |
| | | | 455/522 |
| 2016/0128040 A1 | 5/2016 | Shor et al. | |

OTHER PUBLICATIONS

3GPP TS 36.211: "Evolved Universal Terrestrial Radio Access (E-UTRA); Physical channels and modulation".
3GPP TS 36.212: "Evolved Universal Terrestrial Radio Access (E-UTRA); Multiplexing and channel coding".
3GPP TS 36.213: "Evolved Universal Terrestrial Radio Access (E-UTRA); Physical layer procedures".
Overview of 3GPP Release 8 V0.2.10 (Mar. 2013), http://www.3gpp.org/ftp/Information/WORK_PLAN/Description_Releases/.
Overview of 3GPP Release 9 V0.2.9 (Mar. 2013), http://www.3gpp.org/ftp/Information/WORK_PLAN/Description_Releases/.
Overview of 3GPP Release 10 V0.1.8 (Mar. 2013), http://www.3gpp.org/ftp/Information/WORK_PLAN/Description_Releases/.
Overview of 3GPP Release 11 V0.1.4 (Mar. 2013), http://www.3gpp.org/ftp/Information/WORK_PLAN/Description_Releases/.
Maiden; "Low-loss compression of CPRI baseband data"; EDN Network; Sep. 17, 2014; 12 pages.
Dverview of 3GPP Release 12 V0.08 (Mar. 2013), http://www.3gpp.org/ftp/Information/WORK_PLAN/Description_Releases/.

* cited by examiner

RADIO SIGNAL DECODING AND DECODER

CROSS-REFERENCE TO RELATED APPLICATION(S)

This application is a National Stage Entry under 37 C.F.R. §371 of PCT/IB2013/001610, filed Jul. 1, 2013, the disclosure of which is hereby expressly incorporated by reference in its entirety.

This application is also related to co-pending U.S. patent application Ser. No. 15/085,171, entitled "Method and System for Processing Lower NFFT LTE Rates Over CPRI Link," filed on Mar. 30, 2016, which has a common Assignee.

FIELD OF THE INVENTION

This invention relates to a radio signal decoder comprising a receiver configured to receive a digitized radio signal. The invention further relates to a method for decoding a radio signal. The invention further relates to a computer program.

BACKGROUND OF THE INVENTION

The Long Term Evolution (LTE) standard for wireless communication provides increasing capacity and speed compared to more conventional communication systems. The standard is specified, e.g., in the Release 10 document series of 3GPP.

LTE uses a frequency-division scheme for the uplink from user equipment (UE) to the base station. SC-FDMA is a frequency-division multiple access scheme. A multiple access scheme deals with the assignment of multiple users to a shared communication resource. SC-FDMA is related to OFDMA.

LTE defines three channels from the UE to the basestation: uplink control channel (physical uplink control channel), uplink traffic channel (Physical Uplink Shared Channel, PUSCH, based on SC-FDMA) and sounding reference signals (SRS). The frequencies used for the three uplink channels (PUSCH, PUCCH and SRS) have a common spacing (15 KHz). Moreover, the PUSCH, PUCCH and SRS channel also use the same time domain symbols grid. This means that the time domain to frequency domain conversion may be shared among them, i.e., the FFT and IFFT blocks.

LTE also defines a Random Access Channel (RACH). The RACH is used for initial access or when the UE losses its uplink synchronization. Information on RACH is encoded in a different manner. In LTE Zadoff-Chu sequences are used as a way to convey reference patterns. The RACH is used to get the attention of a base station in order to initially synchronize the device's transmission with the base station. With the RACH, in most cases, there is no certainty that only a single device makes a connection attempt at one time, so collisions can result.

The frequencies of the RACH are not orthogonal to those of the other three uplink channels, i.e., a different subcarrier spacing is used, 1.25 KHz, as opposed to 15 KHz for PUSCH, PUCCH and SRS. This means that the RACH requires its own FFT transform operation.

SUMMARY OF THE INVENTION

The present invention provides a radio signal decoder, integrated circuit, a base station, a method for decoding a radio signal and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
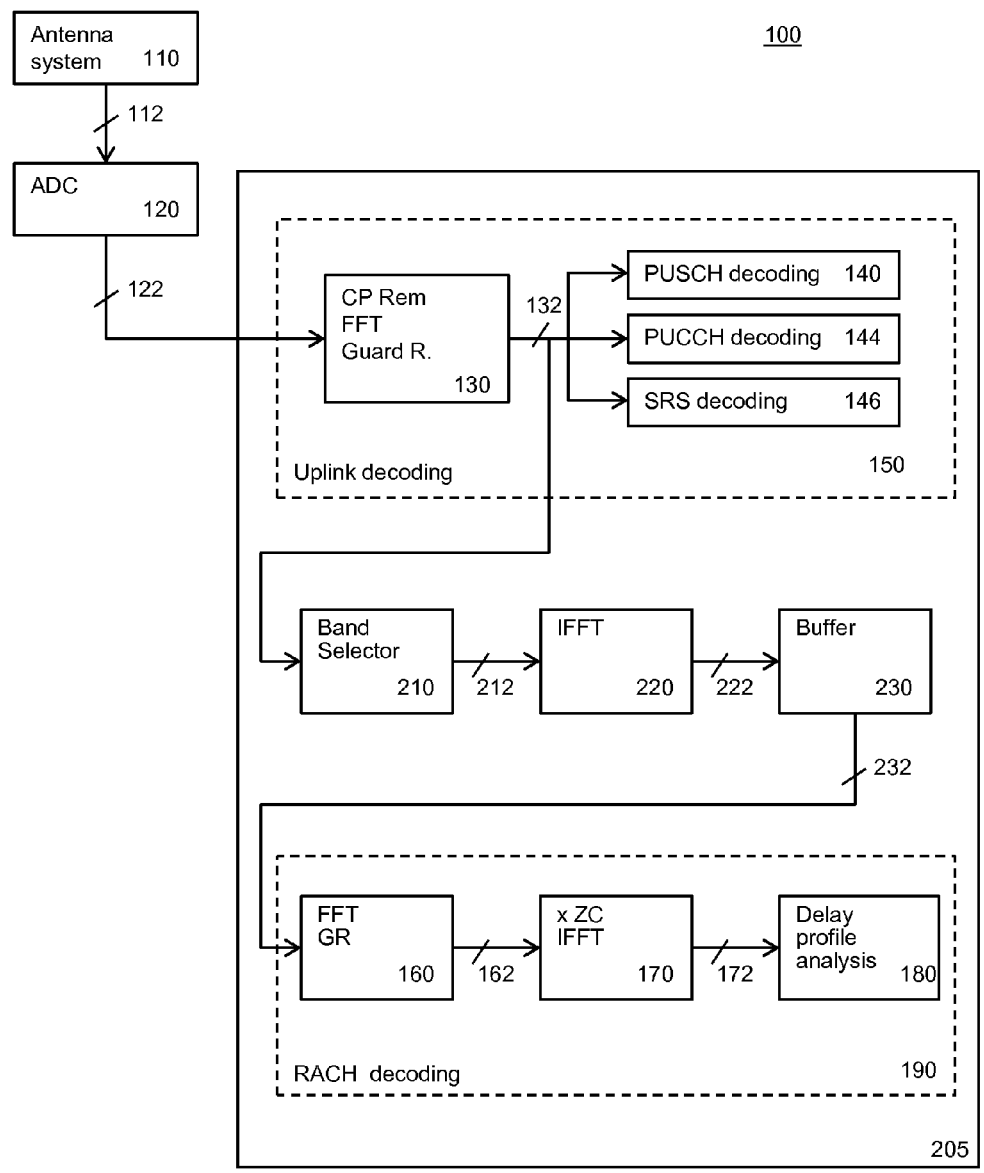
FIG. 1 schematically shows an example of a radio signal decoding system.

FIG. 1 schematically shows an example of a radio signal decoding system 100. Decoding system 100 comprises an antenna subsystem and a radio signal decoder 205. The antenna subsystem comprises an antenna system 110 connected with an analog to digital converter (ADC) 120 for converting a radio signal 112 received from antenna system 110 into a digital form. For example, antenna system 110 may comprise an antenna and an antenna interface for receiving signal 112. Antenna system 110 may comprise multiple antennas. ADC 120 produces a digital antenna signal 122.

Antenna signal 122 has modulated subcarrier frequencies encoding digital information. A first set of the subcarrier frequencies has a first subcarrier spacing, and a second set of the subcarrier frequencies has a second subcarrier spacing. The frequencies of the first and second set are preserved in digital antenna signal 122.

Decoder 205 is suited when the frequencies in the first set are not orthogonal to those in the second set. We will assume that the first subcarrier spacing is larger than the second subcarrier spacing. Information may be encoded by modulating subcarrier frequencies so that the modulated subcarrier frequencies encode digital information in symbols. In particular this may be done for the frequencies in the first set. Symbols modulated on a subcarrier frequency of the first set have a first symbol duration and symbols modulated on a subcarrier frequency of the second set having a second symbol duration. The duration is measured in the time domain.

If the first subcarrier spacing is larger than the second subcarrier spacing, the first symbol duration may be smaller than the second symbol duration. In a embodiment, the first set frequencies are used for communication to decoder 205 by one or more wireless access terminals previously registered with decoder 205, and the second set is used by one or more wireless access terminal for initial access to a network.

In an embodiment, the decoder 205 is configured for decoding an LTE radio signal, wherein the first set of the subcarrier frequencies encodes at least PUSCH data, and/or the second set of the subcarrier frequencies encodes RACH data. In addition the first set of the subcarrier frequencies may also encode PUCCH and SRS data.

Decoding system 100 is explained using LTE as an example. However, decoding system 100 may adapted for other radio signals in which a first set of the subcarrier frequencies has a first subcarrier spacing, and a second set of the subcarrier frequencies has a second subcarrier spacing.

In particular the first set of frequencies may be used for a PUSCH signal, and/or for PUCCH and/or SRS signals. The second set of frequencies may be used for RACH signals. In this application, digital information is encoded by an apparatus for wireless communication over a radio signal, e.g., so-called, user equipment (UE), such as a mobile phone.

In particular, decoding system 100 may be used with 3GPP as specified in: 3GPP TS 36.211: "Evolved Universal Terrestrial Radio Access (E-UTRA); Physical channels and modulation", 3GPP TS 36.212: "Evolved Universal Terrestrial Radio Access (E-UTRA); Multiplexing and channel coding", and 3GPP TS 36.213: "Evolved Universal Terrestrial Radio Access (E-UTRA); Physical layer procedures".

Decoding system 100 may be used in particular with all LTE versions, and all RACH formats, in particular with the RACH procedure described in LTE release 8, release 9, release 10, or release 11.

In most cases, for the RACH there is no certainty that only a single device makes a connection attempt at one time, so collisions can result. This type of RACH is known as "Contention based". In some very specific cases (e.g. in case of timing restrictions) the base station can inform a UE of exactly when and what signature it should send. This type of RACH is known as "Contention free". RACH messages can be configured in different preamble formats (for example, preamble format 0,1,2,3 or 4). The system of FIG. 1 applies to contention free and contention based and all preamble formats.

Decoder 205 comprises a receiver configured to receive digitized radio signal 122. The receiver is not separately shown. The receiver may be implemented as an interface. The receiver may be integrated with other components.

Part of decoder 205 is related to decoding of information received via the first set frequencies; part is related to decoding of information received via the second set frequencies. These parts are schematically indicated with dashed lines and indicated with reference FIGS. 150 and 190, respectively. Note that the way information is encoded on the first or second set respectively may differ. Also the way of processing the resulting data may differ. In the embodiment presented in FIGS. 1-3 different encoding methods are used. Other choices are possible.

Decoder 205 is configured for decoding one more uplink channels. The embodiment of decoder 205 shown in FIG. 1 has three of such channels, all of which are encoded on frequencies of the first set.

Decoder 205 comprises a first transformer 130 (FFT) configured to transform the digitized radio signal from a time domain into a frequency domain. First transformer 130 is configured with the first subcarrier spacing. That is, the transformed signal comprises a series of values each of which represents a frequency that is separated according to the first spacing; neighboring frequencies differing a fixed frequency difference. For example, 15 kHz may be used as the first spacing. First transformer 130 preferably uses the Fast Fourier Transform (FFT), but other time to frequency transforms are possible.

Decoder 205 comprises first decoders 140; 144; 146 configured to reconstruct digital information from the output of the first transformer. In the embodiment shown in FIG. 1, the first decoder can decode for three channels: PUSCH (140), PUCCH (144) and SRS (146).

First transformer 130 as shown in FIG. 1 is further configured to first remove a cyclic prefix from the digitized radio signal, before transforming the digitized radio signal. First transformer 130 as shown in FIG. 1 may also be further configured to remove one or more guard band from said transformed digitized radio signal.

In an embodiment first transformer 130 performs first cyclic prefix removal (CR) in the time domain, then FFT and then a guard remove. The guard removal removes unnecessary subcarriers in the frequency domain (known as guard bands). Moreover, it may also perform a so-called "unwrap" operation (sometimes denoted "FFT shift"). During unwrap lower subcarriers are put on top and vice-versa.

The output 132 of first transformer 130 is a frequency domain signal 132 having a number of samples, or values. For example, in LTE there may be 2048 subcarriers in the FFT operation. After first transformer 130 has done CR, there remain 1200.

During operation this part may operate as follows. A User Equipment in particular in a 3G LTE network (UE), modulates frequencies in the first set, in order to transmit data to decoder 205. For example, UE may upload data, say a photo, using modulation on frequencies of the first set. Digital information encoded as modulated subcarrier frequencies of the first set is transmitted to antenna system 110 and digitized in ADC 120. Digital antenna signal 122 is then processed by first transformer 130. Cyclic prefixes are identified and removed, the remaining signal blocks are transformed, typically using FFT, if needed Guards are removed. After this step PUSCH decoding may operate on those time/frequency blocks allocated to PUSCH, and PUCCH decoding may operate on those time/frequency block allocated to PUCCH, and SRS decoding may operate on those time/frequency block allocated to SRS. The resulting digital information may then be processed as desired by a further signal consumer (not shown).

Note that none of the decoders, e.g. decoders 140, 144 or 146 make use of those frequencies are allocated to the second set.

Per sub frame, multiple UE may be decoded simultaneously. For example, a UE may transmit PUSCH or PUCCH or RACH; typically not several on the same sub frame. Moreover, PUSCH and PUCCH can convey information of many user in the sane sub frame. For example there may be dozens of different PUSCH or PUCCH users per sub frame. For example on sub frame "N", a base station can decode PUSCH for UE0 and UE1, PUCCH for UE2,3,4,5, SRS for UE6,7,8 and scanning RACH for a new UE joining the network.

Decoder 205 recovers digital information encoded as modulated subcarrier frequencies of the second set by performing an inverse transformation. Decoder 205 comprises an inverse transformer 220 (IFFT) configured to receive as input at least a part of the output of the first transformer 130 representing a frequency range overlapping the second set of subcarrier frequencies, and to transform the input from the frequency domain back to the time domain. The size of first inverse transformer is chosen so that it is compatible with the first subcarrier spacing. First transformer 130, inverse transformer 220 use the same type of transformation.

Decoder 205 may comprise a band selector 210. Band selector 210 obtains from the output of first transformer 130 those frequency domain values (bands) that correspond to the part of the output of the first transformer 130 that represent a frequency range overlapping the second set of subcarrier frequencies. A value output by first transformer 130 represent a frequency range of length the first spacing. Also a frequency in the second set represents a range (of the second spacing). A value output by first transformer 130 that does not overlap with anyone of the ranges represented by the frequencies in the second set does not contain information on the information encoded by the second set. Such values, i.e., such frequencies, in the output of first transformer 130 may be ignored. Band selector 210 obtains from first transformer 130 those values that frequencies, in the output of first transformer 130 that are overlapping, i.e., that do contain information, i.e., that may not be ignored. For example, in LTE, band selector 210 may take only 72 subcarriers out of the 1200 subcarriers in first transformer output 132.

Band selector 210 is optional. Inverse transformer 220 could use the full output of first transformer 130 without band selection or only use cyclic prefix removal. Band selector 210 will significantly reduce the amount of memory needed for temporally buffering. In an embodiment, the full output of first transformer 130 is used. If transformer 130 removes cyclic prefixes this still gives a sizeable reduction in the memory architecture.

Decoder 205 comprises a buffer 230 so that the output of inverse transformer 220 on which the second transformer operates has second symbol duration in the time domain. Indeed, the first transformer operated on parts of the digitized radio signal that have a first symbol duration in the time domain, but the second transformer operates on parts of the digitized radio signal having a second symbol duration in the time domain. First time domain 122 and second time domain 222 are not equal. If the second spacing is smaller than the first spacing, e.g. as is the case for PUSCH and RACH respectively, then the first duration will be shorter than the second duration. Through buffer 230 information is buffered until an amount of data is buffered that has a corresponding duration in the time domain of at least the second duration.

Furthermore, not all first set symbols need contain second set information. For example, in LTE 12 of 14 actually overlap the RACH data. Decoder 205 may be configured to ignore the parts of digital antenna signal 122 in the time domain that do not contain second set information.

Inverse transformer 220 may be configured with a power of 2 number of samples. Continuing with the LTE example, one may take 128 sample values. Inverse transformer 220 is applied to all symbols in first transformer output 132 that overlap RACH data. Note that in FIG. 1, the buffer contains values in the time domain, but in FIG. 11 the buffer contains values in the frequency domain.

Buffer 230 may be located at different points in the processing flow.

FIG. 1 shows a buffer 230 that is configured to receive and buffer the output from buffer 230 obtained by transforming the input of the inverse transformer from the frequency domain back to the time domain. A second transformer 160 is configured to receive the output of inverse transformer from the buffer.

Figure 11:
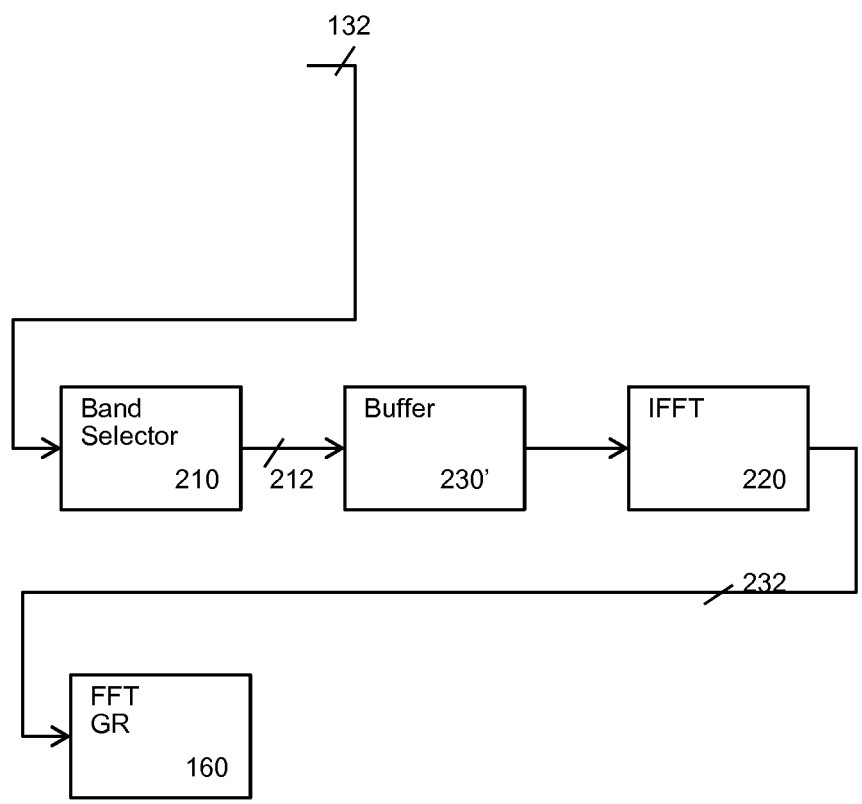
FIG. 11 shows an alternative placement of a buffer for use in FIG. 1.

FIG. 11 shows an alternative placement for buffer 230 that may be applied in FIG. 1 (among others). FIG. 11 shows a buffer 230' that is configured to receive output from first transformer 130, in the shown case via band selector 210. Buffer 230' is configured to buffer the at least a part of the output of the first transformer representing a frequency range overlapping the second set of subcarrier frequencies. Inverse transformer 220 is configured to receive the input from the buffer.

Below the description of FIG. 1 continues.

Decoder 205 is further configured for reconstructing the digital information encoded on frequencies in the second set. This encoding could use symbol encoding by modulation of a subcarrier, but this is not needed. FIG. 1 shows Rach decoding as an example.

Decoder 205 comprises a second transformer configured to transform the output of inverse transformer 220 from the time domain to a frequency domain. The second transformer is configured with the second subcarrier spacing. Also second transformer 160 may use FFT.

A Finite impulse response (FIR) filter may be used before second transformer 160 and after inverse transformer 220 in order to reduce the transform size needed for block 160, for example if Band Selector 210 is not used. There are several options: For example, Decimation (downsampling+FIR). Decimation may be done to adjust the sampling rate to the one of RACH. For example 1/12 for 20 MHz case. Decimation may be combined with a FIR operation that filters out the RACH neighbor frequencies (for anti-aliasing). There are also multiple options for performing the inverse transformation (IFFT) and the following Decimation & FIR. In a first option, inverse transformer 220 is used to transform size the same as first transformer 130. This leads to correct decimation of same rate and a shorter FIR filter can be used, since the PUSCH aliasing is removed. For example, for 20 MHz bandwidth and a decimation ratio of 12, a FIR size of 32 taps can be used in FIG. 1, compared to FIR size of 96 or 128 taps as would be needed in FIG. 2. This is a reduction in complexity of 3 times for the FIR operation for FIG. 1 compared to FIG. 2 (see below).

A second option is to use a shorter IFFT transform size in inverse transformer 220 than the FFT in first transformer 130, for example transform size 128. In this case, there is even no need for FIR filtering since the sampling rate is already matching standard FFT transform sizes (for example 12*128=1576). FIG. 1 shows this option in which no FIR operation is done. This is a significant reduction in overall processing. For example, for a base station FIR operation takes about 5 to 10% of processing resources.

For example, for RACH preamble format 0 or 1, second transformer 160 may act on 12*128=1536 samples, i.e., the number of output samples of inverse transformer 220 times the number of symbols overlapping second set data in the time domain. In this case no down sampling is needed. Second transformer 160 then produces 1536 samples in the frequency domain. On this guard removal may be done (GR). For example, out of 1536 samples 839 subcarriers related to the RACH signal may then remain. Finally, these 839 subcarriers may be processed. For RACH preamble format 2 and 3, the situation is similar except that there are 2×12=24 symbols.

One way to determine which symbols to discard is using the timing; the RACH signal is starts at a predetermined time during the second PUSCH symbol. Accordingly, the first and last symbol may be dropped.

Preferably, second transformer 160 does not perform cyclic prefix removal, but may remove one or more guard bands. Also an unwrap operation is possible here as well.

Decoder 205 comprises a second decoder. In this case, the second decoder comprises a Zadoff-Chu signature correlations finding unit 170 and a delay profiler analyzer 180. Zadoff-Chu unit signature correlations finding 170 and delay profiler analyzer 180 together form the second decoder.

The second decoder (here formed by unit 170 and analyzer 180) is configured to reconstruct digital information from the output of the second transformer. Decoder 205 receives frequency information from second transformer 160, which has been transformed with the correct second spacing. For example, Zadoff-Chu unit 170 may comprise a multiplication by the conjugate reference Zadoff-Chu signature, an inverse IFFT and a peak search. For example, unit 170 may comprise a correlation with a reference signature. Indeed, a good choice for reference signatures are Zadoff-Chu signatures. Zadoff-Chu unit 170 is also known as a Zadoff-Chu decoder. Zadoff-Chu unit 170 may obtain an identifier of a user equipment (UE). In particular, the Zadoff-Chu unit 170 may be used obtain an identifier of user equipment, which in turn is used for registration of the UE. Correlation of the received signal from second transformer 160 versus a series of reference signatures (ZC sequences) may be done to obtain an identifier.

In an embodiment second transformer 160 performs FFT and Guard Removal (GR) and Zadoff-Chu unit 170 performs multiplication by the conjugate of the RACH Zadoff-Chu reference sequence, resulting in a frequency domain representation of the fading channel path. An IFFT operation is used to bring the fading channel into the time domain. Note that these steps may be bundled for implementation efficiency. Decoder 205 may comprise a delay profile analyzer 180 for time domain channel delay profile analysis, e.g., peak search.

RACH is a signal sent by the UE in order to initiate an attach connection to the base station. Unlike the other uplink channels, RACH uses a special subcarrier spacing and symbol duration; e.g., the second spacing and second duration. RACH (Random Access Channel) is also used as a channel of the LTE standard.

RACH subcarriers are typically surrounded by PUSCH subcarriers. These two types of channels are not exactly orthogonal between each other since they do not use the same subcarrier spacing and have different symbol durations. For example, RACH preamble format 0 symbol duration in LTE is 0.8 ms. During the time period, several PUSCH symbols will be present, with some time domain discontinuities at each PUSCH symbols ends. The relative amount of interference depends, amongst others, on the allocation size (expressed in number of physical resource blocks (PRB)) and offset (expressed in PRB) to the RACH subcarriers of interest.

Figure 8A:
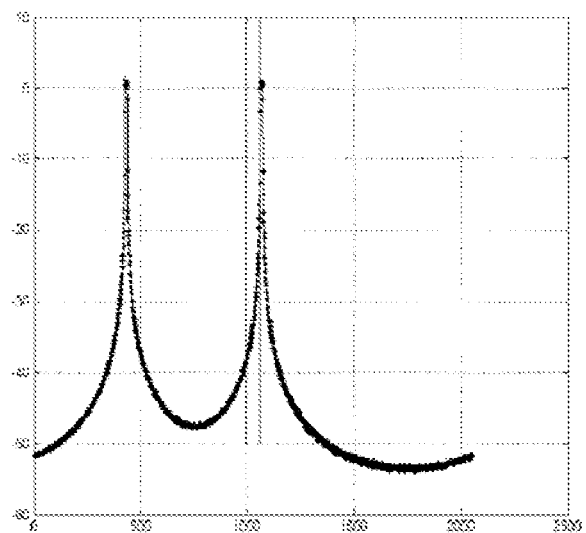
FIGS. 8a and 8b show graphs illustrating PUSCH interference on RACH, in an LTE system.
Figure 8B:
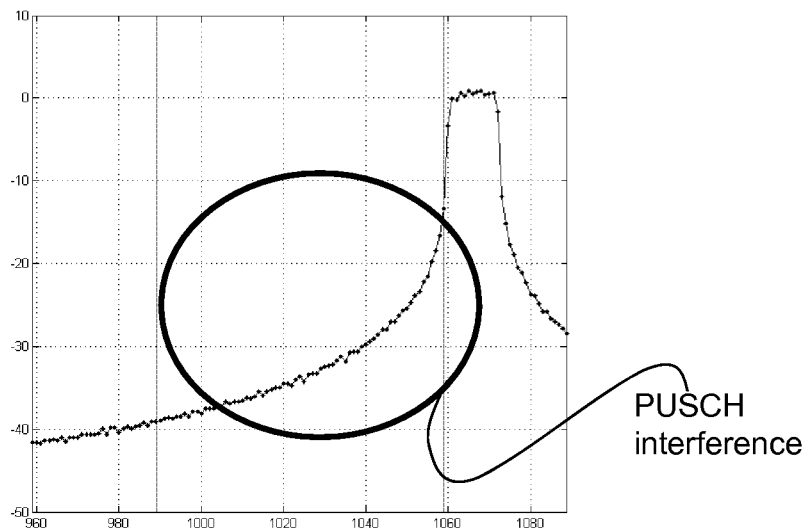

FIG. 8a shows as an example: 6RB dedicated to RACH in the middle of the bandwidth (not populated). 2 PUSCH SIMO allocations of 1 PRB, one on each side of the band, once just next to RACH, another 46 PRB away. The observed interference level on the RACH subcarriers is −26.5 dB (relative to nominal PUSCH power). FIG. 8b shows a zoom of graph 8b in which the interference of PUSCH symbols on the RACH signal is shown.

In Single-input and multiple-output (SIMO) the transmitter (UE) has a single antenna, but the receiver, e.g., the base station, has multiple antenna's.

Interference is reduced by band selector 210 if it removes signals unrelated to RACH, e.g. PUSCH. In particular band selector 210 may remove from first transformer output 132 those bands that correspond to subcarrier frequencies of the first set.

Figure 9A:
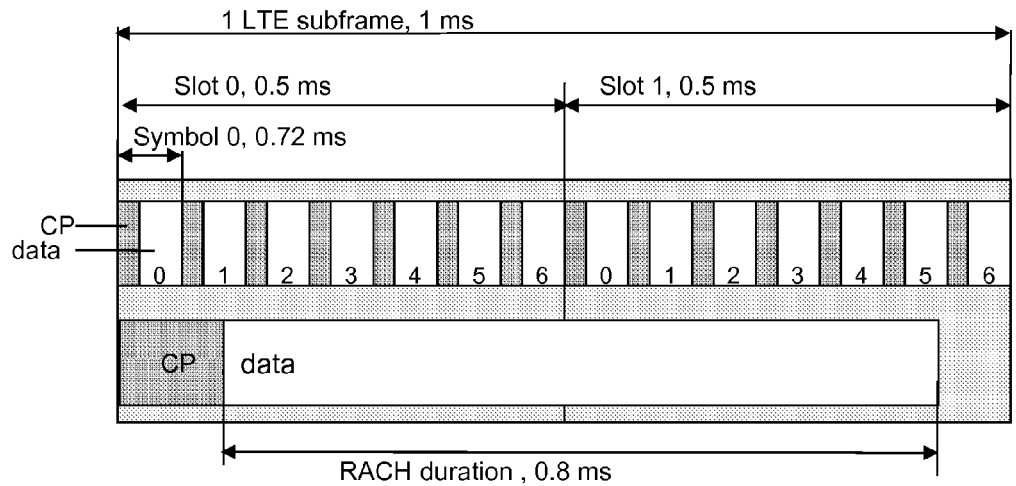
FIG. 9a illustrates an LTE frame.
Figure 9B:
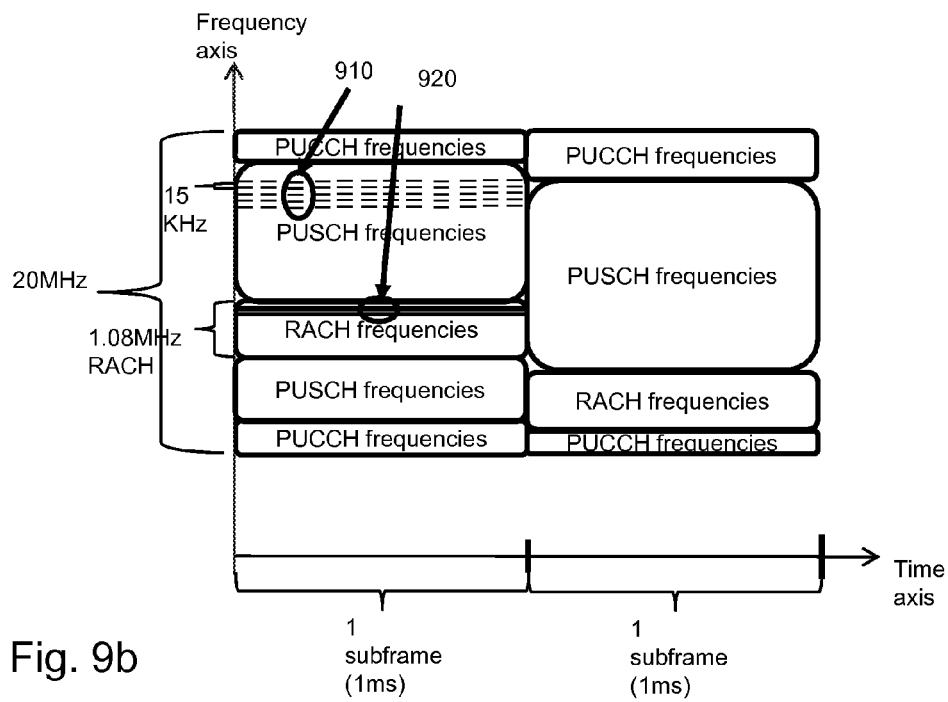
FIG. 9b illustrates LTE frequency allocation.

FIG. 9a shows an LTE subframe, divided into two slots. Two sets of frequencies are shown. At the top are is the first set. In these frequencies symbols are encoded, 7 per slot. The symbols are separated by cyclic prefixes. In LTE, there may be 2048 time samples per first set symbol and 144 or 160 samples per cyclic prefix (CP). Below is the second set. Note that a symbol of the second set has much longer duration than a symbol of the first set. In LTE there are 24576 time samples per RACH symbol. In FIG. 9a, time increases from left to right. FIG. 9b shows two LTE subframes. The horizontal axis is a time axis; the vertical is a frequency axis. The block indicates the time/frequency combinations that are allocated to the various channels. Note in particular, that the subcarriers in PUSCH frequencies (indicated with dashed lines) and in the RACH frequency (indicated with dashed lines) have a larger spacing.

Note that the division of frequency of the first and second set changes with time. Each subframe is layed-out differently. In LTE: RACH bandwidth is 1.08 MHz; PUSCH subcarriers spacing is 15 KHz (time=0.072 ms per symbol) (12 symbols); RACH subcarriers spading is 1.25 KHz (time=0.8 ms per symbol) (1 symbol).

Interestingly, in FIG. 1 PUSCH post-FFT data is used as a starting point for RACH decoding, and not the antenna data itself. If PUSCH/PUCCH/SRS signal is removed from the original signal so that it contains only RACH signal, PUSCH interference is reduced. Starting from second transformer 160, the RACH chain may be as conventional; including big FFT based or FIR based.

To remove the PUSCH/PUCCH/SRS subcarriers from digital antenna signal 122, the "PUSCH" post FFT samples are used (first transformer output 132). For example, these PUSCH/PUCCH/SRS subcarriers are zeroed. The subcarriers are converted back to time domain with a reverse transformation using inverse transformer 220. This reverse transformation may include half sbc shift. Although removed CP may inserted back, e.g., in an insert operation, e.g. done by band selection 210. However, cyclic prefix insertion is, preferably, skipped. Instead, zeros may be inserted instead of the cyclic prefixes. Re-insertion of the cyclic prefix or preferably the zero's, may be done in the buffer 230 if it is after inverse transformer 220. It may also be done by second transformer 160, e.g., just before transformation starts. The time domain signal obtained by inverse transformer 220 contains then only the RACH subcarriers. Theoretically, there may be a slight degradation in performance under no interference conditions if cyclic prefixes are removed in first transformer 130, e.g., filled with zeros. Nevertheless, even with moderate interference this loss is more than offset by reducing the interference.

In an embodiment, a base station comprises radio signal decoder 100.

Figure 2:
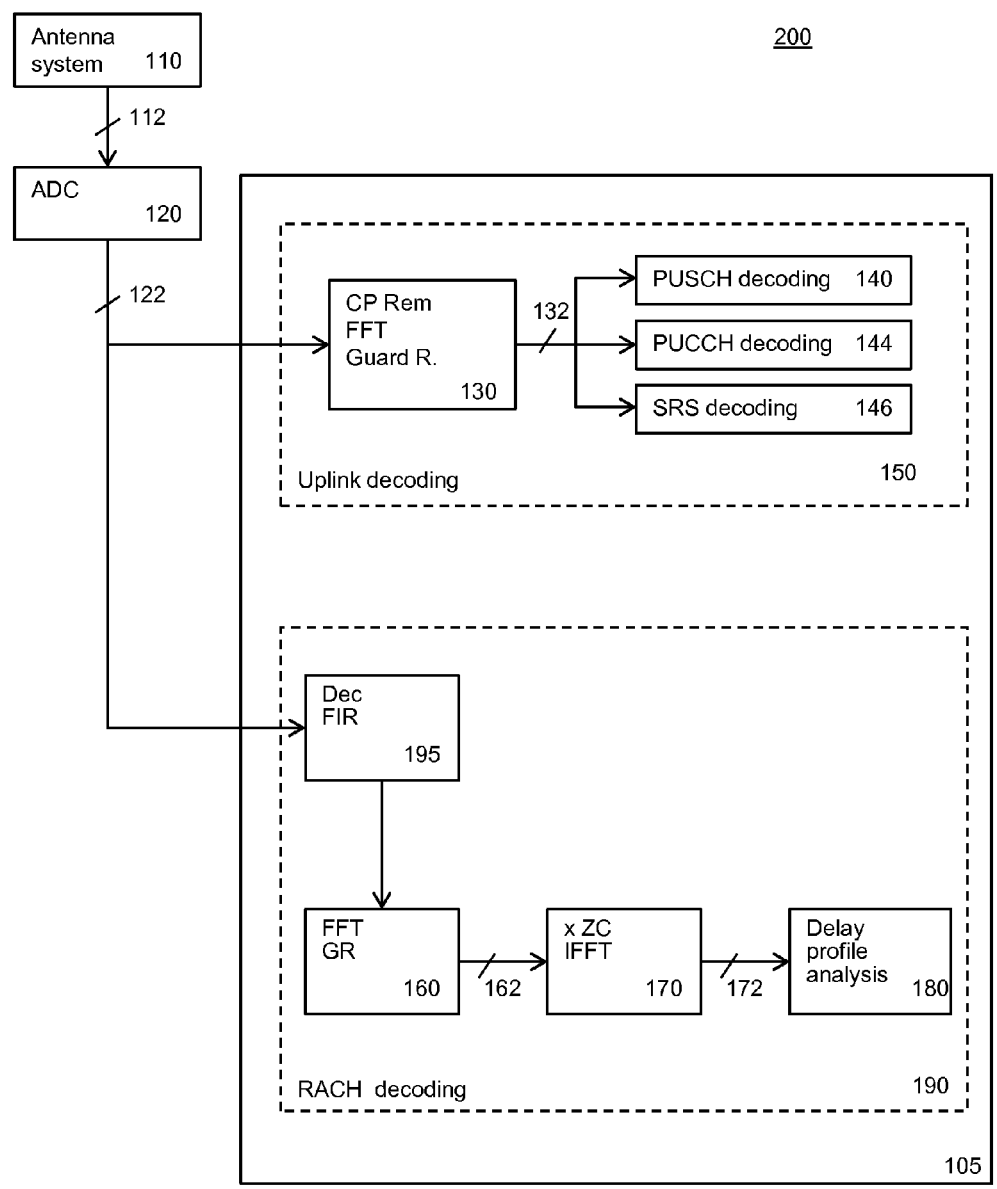
FIG. 2 schematically shows an example of an alternative radio signal decoding system, FIG. 3 schematically shows an example of an embodiment of radio signal decoding system, FIG. 4 schematically shows an example of an embodiment of an integrated circuit, FIG. 5 schematically shows an example of a method of decoding a radio signal, FIG. 6 schematically shows an exemplary user interaction system.

FIG. 2 also shows an alternative radio signal decoder. The radio signal decoder of FIG. 2 is in many ways similar as that of FIG. 1 but does not have an inverse transformer (IFFT) configured to receive as input at least a part of the output of the first transformer representing a frequency range overlapping the second set of subcarrier frequencies, and to transform the input from the frequency domain back to the time domain, the first inverse transformer being configured with the first subcarrier spacing. FIG. 2 also does not have a second transformer (FFT) configured to transform the output of inverse transformer from the time domain to a frequency domain, the second transformer being configured with the second subcarrier spacing. Instead a transformer 160 is used to transform a copy of signal 122. The system of FIG. 1 is better than that of FIG. 2 in many respects.

In FIG. 2, the signal digital antenna signal 122 is copied to both part 150 and to part 190. This means that a large and fast memory is needed to copy this large amount of data.

The RACH decoding uses a decimation (down sampling) and FIR filtering part 195. Decimation adjusts the sampling rate to the one of RACH. For example 1/12 for the 20 MHz case of LTE. Decimation maybe combined with a FIR operation that filters out the RACH neighbor frequencies for anti-aliasing.

RACH decoding algorithms such as used in FIG. 2 suffer a loss in decoding performance when PUSCH users in the adjacent frequencies are transmitting at a significant higher power than the RACH user. This is due to several effects, such as: higher signal dynamic of PUSCH that may limit digital precision on RACH signal, frequency leakage of PUSCH subcarriers over RACH frequencies (FIGS. 8a and 8b) and to aliasing that may arise when performing FIR and decimation filtering. Note that typically, the RACH and PUSCH channels are not used by the same UE, since RACH is used for registering to the network but PUSCH as an uplink data transfer channel, which presumes registration has already been done. The system of FIG. 1, however, is almost immune to PUSCH adjacent subcarriers effects.

FIR filtering unit 195 is configured for FIR filtering. A FIR filter may have various lengths. Long filters are needed for correct removal of aliasing (from RACH & PUSCH). Moreover, RACH decoding performance depends on PUSCH power (relative to RACH channel power).

In FIG. 2, the RACH algorithm starts degrading at +35 dB and detecting is impossible past +40 dB. This was assessed throughout simulations, for a wide range of scenarios including: 2 & 4 receive antennas, PUSCH power (relative to RACH power) from −240 to +50 dB and various FIR lengths Removing part of, or preferably even all of, the PUSCH from the digital antenna signal 122 signal, as may be done in FIG. 1 by starting from FFT output, as opposed to using the digital antenna signal 122 itself acts as a frequency domain FIR. This improves performance of decoding. It has been verified to improve decoding even under heavy PUSCH power. At least as significant is however the improved memory architecture of FIG. 1 compared to FIG. 2.

In FIG. 2, the output of first transformer 130 is not used for reconstructing the digital information encoded on frequencies in the second set. This is also not directly possible. There are several reasons for this. First of all, if the first spacing is different from the second spacing, the FFT operation in first transformer 130 will not give the correct frequencies, especially if the frequencies of the first and second set are not orthogonal. Moreover, if the spacing in the first set is larger than that of the second set, its symbols have a shorter duration in time. This means that not enough data (not a large enough part of digital antenna signal 122) is processed by first transformer 130 to recover the information encoded in frequencies of the second set.

Figure 3:
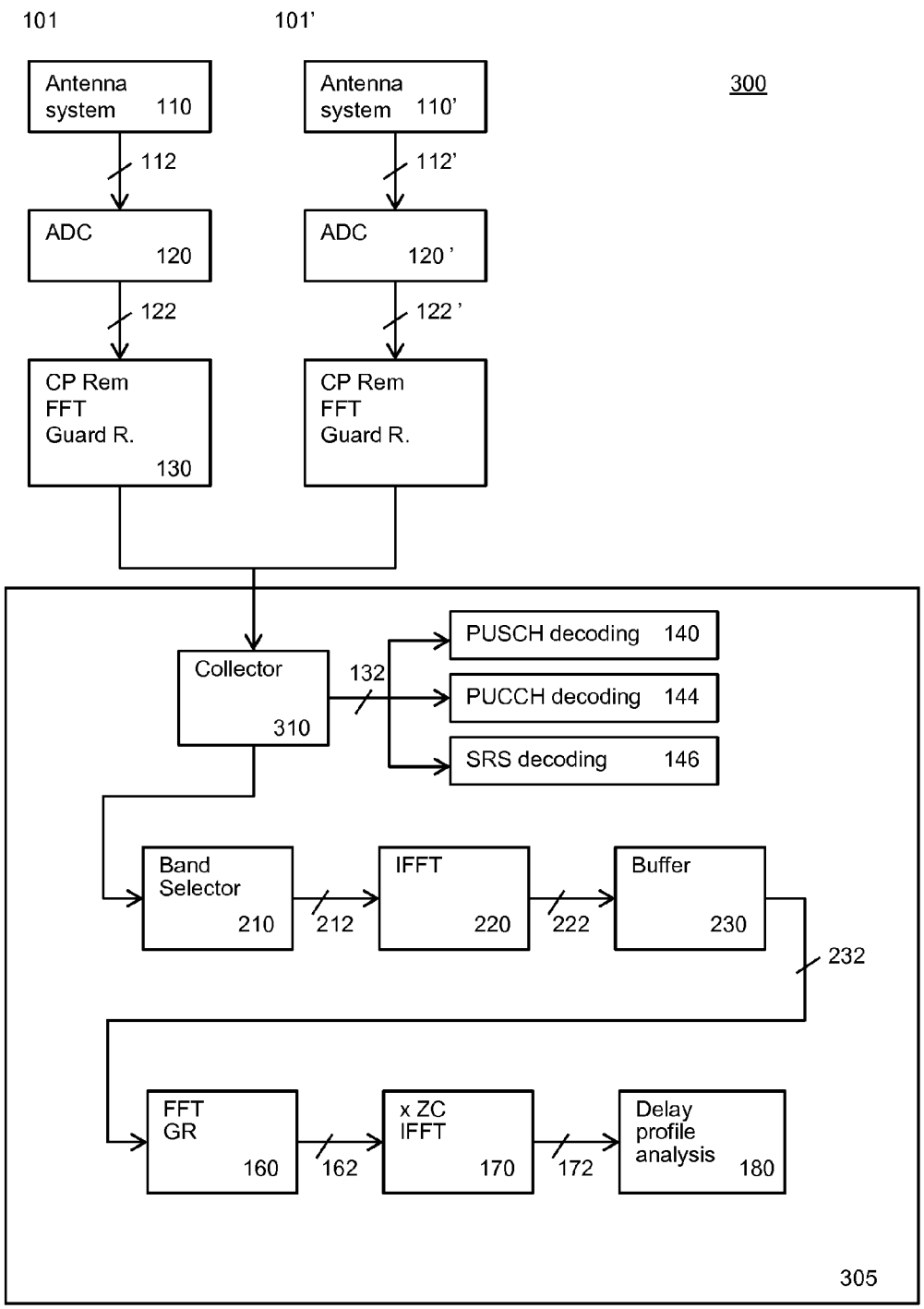

FIG. 3 schematically shows an example of an embodiment of a distributed radio signal decoding system 300. FIG. 3 is based on FIG. 1, and is shown here for two antennas.

Decoding system 300 comprises an antenna module and a decoding module 305. FIG. 3 show two antenna modules 101 and 101'; more or fewer antenna modules are possible.

The antenna modules each comprise a receiver configured to receive a digitized radio signal. The radio signal has modulated subcarrier frequencies encoding digital information, a first set of the subcarrier frequencies having a first subcarrier spacing, a second set of the subcarrier frequencies having a second subcarrier spacing. The antenna modules each comprise a first transformer (130 and 130') configured to transform the digitized radio signal from a time domain into a frequency domain, the transformer being configured with the first subcarrier spacing, Antenna systems 110 and 110' and ADCs 120 and 120' may be taken as in FIG. 1.

Decoding module 305 comprises a collector 310 to collect antenna signals of the multiple antenna modules. Such a collector could also be used in other system shown herein, having multiple antenna's. Decoding module 305 further comprises the decoders 140, 144, and 146 to reconstruct digital information from the output of the first transformer. The processing of the RACH signal is the same as in FIG. 1. The antenna module(s) may be configured to transmit the first transformed signal over a wired connection to the decoding module.

In a distributed architecture of FIG. 3 with remote radios (e.g. macro/metro base stations), the antennas need not be located next to the decoding unit. Data transferred between the remote units need not be in the time domain data, not even for RACH processing.

Instead, the FFT transform needed for PUSCH decoding is done in the remote radio. It leads to: a strong packing (−45%) of the data between remote radios & the central processing unit, sending the frequency domain data instead of the time domain data. This is because of saving the cyclic prefixes & guard bands. This also relaxes the constraints on transmission, and e.g. reduces the number of fiber cable. Furthermore, FIG. 3 allows usage of other transmission protocols from the antenna module to the decoding module that are not antenna data oriented, e.g., a packet based digital communications network such as Ethernet. In an embodiment, the distance between the antenna module and the decoding module is more than 50 meters.

Decoding module 305 or decoder 205 may be integrated on an integrated circuit. Decoding module 305 or decoder 205 may be comprised in a base station. Antenna module 101 could be comprised in a base station.

Figure 4:
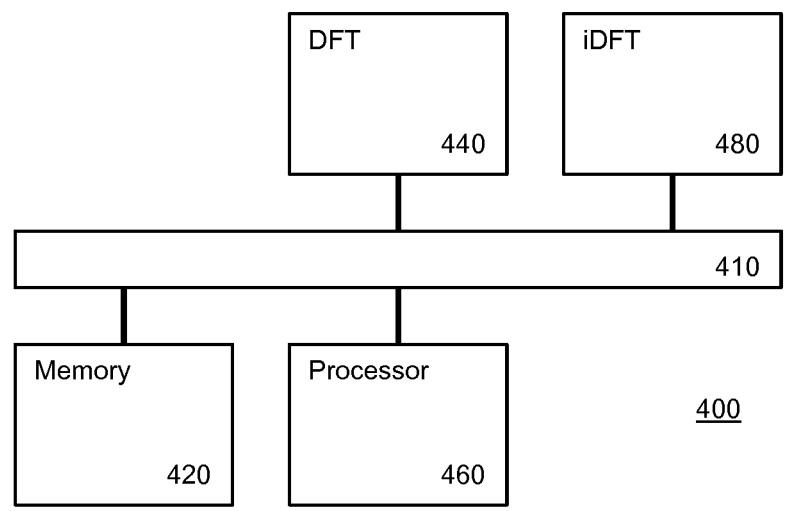

FIG. 4 is schematic illustration of an integrated circuit 400. The integrated circuit has several units including: a DFT unit 440, an inverse DFT unit 480, a memory 420, and a processor 460. These units may be interconnected using an interconnect 410, say a bus.

Processor 460 may be configured to use DFT unit 440 as the first and second transformer, and inverse DFT unit 480 as the inverse transformer (IFFT). Memory 420 may be use to buffer FFT data obtained by the first transforming for inverse transforming and subsequent second transforming.

It is also possible to implement circuit 400 in dedicated hardware without reliance on software. For example, memory 420 is used for the buffer, and the processor comprises control logic for implementing decoder 205.

In an embodiment, the integrated circuit comprising a circuitry which comprises input lines for receiving a digitized antenna signal. For example, in an embodiment, a base station comprises the integrated circuit.

Figure 5:
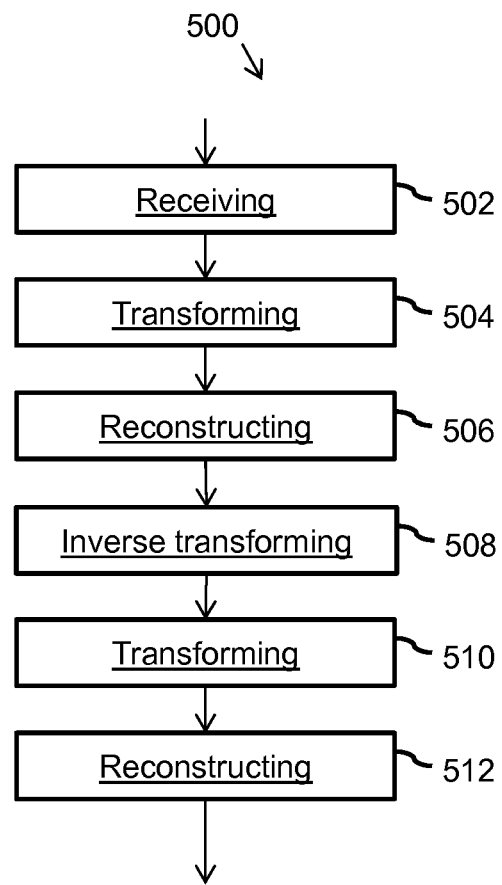

FIG. 5 is schematic flow chart illustrating an example of a method 500 of decoding a radio signal. Of the method steps 502-512 are illustrated.

In step 502 a digitized radio signal is received, the radio signal having modulated subcarrier frequencies encoding digital information, a first set of the subcarrier frequencies having a first subcarrier spacing (PUSCH), a second set of the subcarrier frequencies having a second subcarrier spacing (RACH). In step 504 the digitized radio signal is transformed from a time domain into a frequency domain, the transformer being configured with the first subcarrier spacing. In step 506, digital information is reconstructed from the output of the first transformer. In step 508, inverse transforming is performed. The inverse transforming comprises receiving as input at least a part of the output of the first transformer representing a frequency range overlapping the second set of subcarrier frequencies, and transforming the input from the frequency domain back to the time domain, the first inverse transformer being configured with the first subcarrier spacing. In step 510 the output of inverse transformer is transformed from the time domain to a frequency domain. In step 512 the digital information is reconstructed from the output of the second transformer.

Figure 10A:
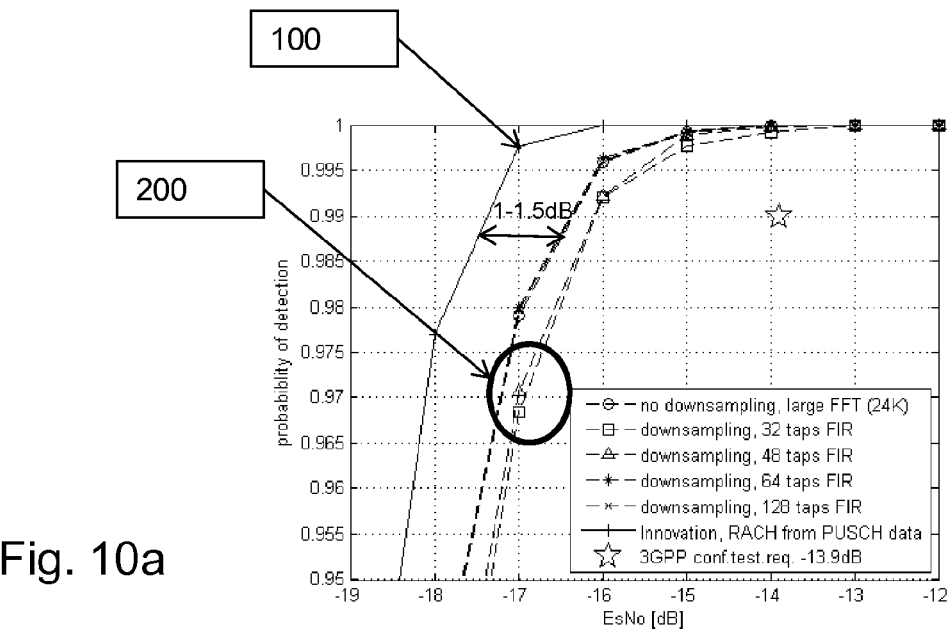
FIGS. 10a and 10b are graphs with simulation results that illustrate improved reception of RACH.
Figure 10B:
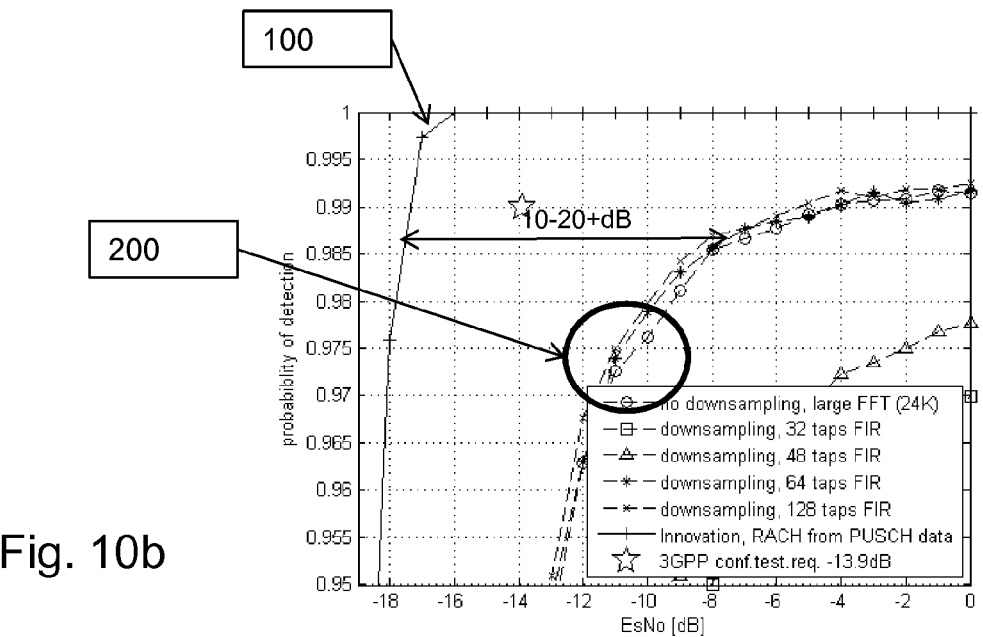

FIG. 10a shows a missed detection test (probability of correct detection). The PUSCH signal power is set 35 db stronger than the RACH signal power and the channel type is AWGN for 2 receive antennas. Reference number 100 shows performance with removal of PUSCH data before RACH processing using a system as in FIG. 1, and reference number 200 shows performance by working with a FIR filter in a system as in FIG. 2. FIG. 10b shows the same test but with a PUSCH power of 40 db. Note the significantly better performance.

The system according to FIG. 1 performs significantly better when PUSCH users in the adjacent frequencies are transmitting at a significant higher power than RACH user than the system of FIG. 2. One can see it is completely immune to the PUSCH interference and still functional at extreme PUSCH levels. The only drawback is a loss in performance 0.2-0.3 dB when PUSCH is absent; this is because of discarding the cyclic prefix in the time domain samples in first transformer 130.

Figure 6:
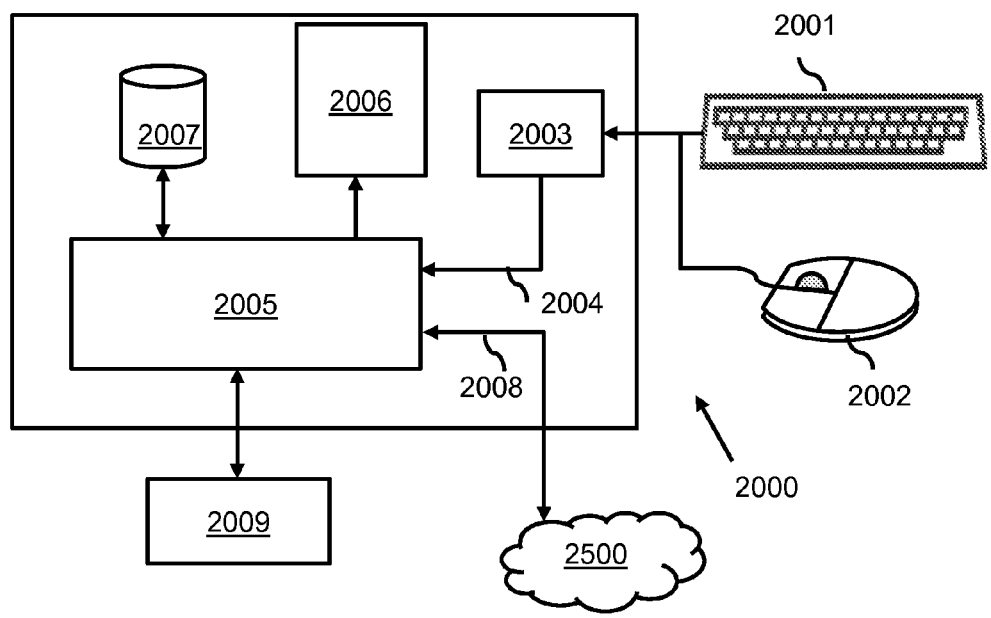

FIG. 6 schematically shows an exemplary user interaction system 2000 having a programmable processor 2005. The user interaction system 2000 is shown to be a personal computer, but may be any type of suitable user interaction system 2000. The programmable processor may comprise one or more components of system 11. The user interaction system 2000 further comprises a storage unit 2007, a user input 2003 and a display 2006, which may be the same as display 521 in FIG. 2 or an additional display. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods according to the invention, to receive user data and user instructions 2004, to present visual information on the display 2006 and to communicate with a data I/O device 2009, such as an optical disc drive or a solid state reader/writer. The processor 2005 is arranged to cooperate with the storage unit 2007, allowing storing and retrieving information on the storage unit 2007, such as the digitized radio signal (122), the transformed digitized radio signal (132), and the like.

The user interaction system 2000 may further comprise a communication channel 2008 allowing the processor 2005 to connect to an external cloud 2500 for communicating with other devices in the cloud. The external cloud may e.g. be the Internet. The user interaction system 2000 may allow creating an aggregated signal by a user. The processor 2005 may also be arranged to retrieve parameters determined during further executions from the storage unit 2007, or from another device in the cloud 2500, and generate a report by the processor 2005. The processor 2005 may be capable to read, using the data I/O device 2009, a computer readable medium comprising a program code. The processor 2005 may be capable to read, using the data I/O device 2007, a computer readable medium comprising a computer program product comprising instructions for causing the user interaction system 2000 to perform a method of method for decoding a radio signal, the method comprising receiving a digitized radio signal, the radio signal having modulated subcarrier frequencies encoding digital information, a first set of the subcarrier frequencies having a first subcarrier spacing (PUSCH), a second set of the subcarrier frequencies having a second subcarrier spacing (RACH), transforming the digitized radio signal from a time domain into a frequency domain, the transformer being configured with the first subcarrier spacing, and reconstructing digital information from the output of the first transformer, and inverse transforming, comprising receiving as input at least a part of the output of the first transformer representing a frequency range overlapping the second set of subcarrier frequencies, and to transforming the input from the frequency domain back to the time domain, the first inverse transformer being configured with the first subcarrier spacing, and transforming the output of inverse transformer from the time domain to a frequency domain, the second transformer being configured with the second subcarrier spacing, reconstructing digital information from the output of the second transformer.

Figure 7:
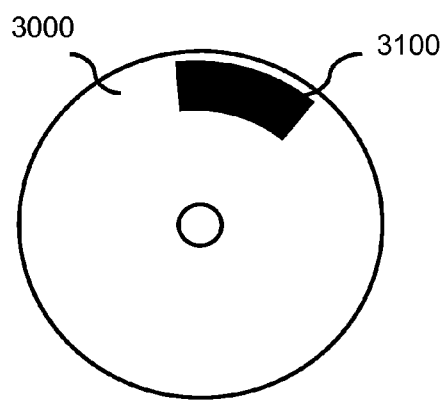
FIG. 7 shows a computer readable medium comprising a computer program product.

FIG. 7 shows a computer readable medium 3000 comprising a computer program product 3100, the computer program product 3100 comprising instructions for causing a processor apparatus to perform a method for decoding a radio signal.

The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 7 as an optical disc, the computer readable medium 3000 may be any suitable computer readable medium, such as a hard disk, solid state memory, flash memory, etc., and may be non-recordable or recordable.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The integrated circuit may comprise a semiconductor substrate. The semiconductor substrate can be any semiconductor material or combinations of materials, such as gallium arsenide, silicon germanium, silicon-on-insulator (SOI), silicon, monocrystalline silicon, the like, and combinations of the above.

As used herein, the term "bus" is used to refer to a plurality of signals or conductors which may be used to transfer one. The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 and/or 300 and/or 400 are circuitry located on a single integrated circuit or within a same device. Alternatively, system 100 and/or 300 may include any number of separate integrated circuits or separate devices interconnected with each other. For example, memory 230 or 420 may be located on a same integrated circuit as units 160 and/or 460 respectively or on a separate integrated circuit or located within another peripheral or slave discretely separate from other elements of system 100, 300 and/or 400. Also for example, system 100, 300 and 400 or portions thereof may be soft or code representations of physical circuitry or of logical representations convertible into physical circuitry. As such, system 100, 300 and/or 400 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 100, 300 and/or 400, for example, from computer readable media such as medium 3000 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semi-conductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 100, 300 and/or 400 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A radio signal decoder comprising:
   a receiver configured to receive a digitized radio signal, the radio signal having modulated subcarrier frequencies encoding digital information, wherein the modulated subcarrier frequencies include a first set of subcarrier frequencies with a first subcarrier spacing and a second set of subcarrier frequencies with a second subcarrier spacing, the second subcarrier spacing different from the first subcarrier spacing;
   a first transformer configured with the first subcarrier spacing and configured to transform the digitized radio signal from a time domain into a frequency domain, the first transformer producing a first transformed signal having a value for each frequency in the first set of subcarrier frequencies;
   a first decoder configured to reconstruct digital information from output of the first transformer;
   an inverse transformer configured to:
      receive as input at least a part of the output of the first transformer representing a frequency range overlapping the second set of subcarrier frequencies, and
      transform the input from the frequency domain back to the time domain;
   a second transformer configured with the second subcarrier spacing and configured to transform the output of the inverse transformer from the time domain to a frequency domain, the second transformer producing a second transformed signal having a value for each frequency in the second set;
   a second decoder reconstructing digital information from output of the second transformer.

2. The radio signal decoder as in claim 1, wherein the first subcarrier spacing is larger than the second subcarrier spacing.

3. The radio signal decoder as in claim 1, wherein modulated subcarrier frequencies encode digital information in symbols, symbols modulated on a subcarrier frequency of the first set of subcarrier frequencies having a first symbol duration, symbols modulated on a subcarrier frequency of the second set of subcarrier frequencies having a second symbol duration, wherein the first symbol duration is smaller than the second symbol duration.

4. The radio signal decoder as in claim 3, the first transformer operating on parts of the digitized radio signal having the first symbol duration in the time domain, the second transformer operating on parts of the digitized radio signal having the second symbol duration in the time domain, the radio signal decoder comprising a buffer so that the output of inverse transformer on which the second transformer operates has the second symbol duration in the time domain.

5. The radio signal decoder as in claim 4, wherein the buffer is configured to receive from the first transformer and buffer the at least a part of output of the first transformer representing a frequency range overlapping the second set of subcarrier frequencies, the inverse transformer being configured to receive the input from the buffer.

6. The radio signal decoder as in claim 4, wherein the buffer is configured to receive and buffer output from the inverse transformer obtained by transforming input of the inverse transformer from the frequency domain back to the time domain, the second transformer being configured to receive output of the inverse transformer from the buffer.

7. The radio signal decoder as in claim 1, wherein the second decoder is configured for an inverse Fast Fourier Transform and peak search.

8. The radio signal decoder as in claim 1, wherein the second decoder is configured for a correlation with a reference signature.

9. The radio signal decoder as in claim 1, wherein the second decoder obtains an identifier of a user equipment.

10. The radio signal decoder as in claim 1, wherein the first decoder is configured to first remove a cyclic prefix from the digitized radio signal, before transforming the digitized radio signal.

11. The radio signal decoder as in claim 1, for decoding an LTE radio signal, wherein
the first set of subcarrier frequencies encodes at least PUSCH data, and
the second set of subcarrier frequencies encodes RACH data.

12. The radio signal decoder as in claim 1, for decoding an LTE radio signal, wherein the first set of subcarrier frequencies encodes PUSCH, PUCCH and SRS data.

13. The radio signal decoder as in claim 11, wherein at least one band allocated to PUSCH, PUCCH, and SRS is removed from the original signal before RACH signal processing by the second decoder.

14. The radio signal decoder as in claim 1 wherein the radio signal decoder is geographically distributed, the radio signal decoder having an antenna module and a decoding module, the antenna module comprising the receiver and first transformer, the decoding module comprising the first decoder, the inverse transformer, the second transformer and the second decoder, wherein the antenna module is configured to transmit the first transformed signal to the decoding module.

15. A method for decoding a radio signal, the method comprising:
receiving a digitized radio signal, the radio signal having modulated subcarrier frequencies encoding digital information, wherein the modulated subcarrier frequencies include a first set of subcarrier frequencies with a first subcarrier spacing and a second set of subcarrier frequencies with a second subcarrier spacing, the second subcarrier spacing different from the first subcarrier spacing;
transforming the digitized radio signal from a time domain into a frequency domain at a first transformer to produce a first transformed signal having a value for each frequency in the first set of subcarrier frequencies;
reconstructing digital information from output of the first transformer;
inverse transforming, comprising
receiving as input at least a part of the output of the first transformer representing a frequency range overlapping the second set of subcarrier frequencies, and
transforming the input from the frequency domain back to the time domain;
transforming the output of inverse transformer from the time domain to a frequency domain at a second transformer to produce a second transformed signal having a value for each frequency in the second set; and
reconstructing digital information from output of the second transformer.

16. A radio signal decoder comprising:
a receiver configured to receive a digitized radio signal, the radio signal having modulated subcarrier frequencies encoding digital information, wherein the modulated subcarrier frequencies include a first set of subcarrier frequencies and a second set of subcarrier frequencies, and wherein modulated subcarrier frequencies encode digital information in symbols, the symbols modulated on a first subcarrier frequency of the first set of subcarrier frequencies having a first symbol duration, the symbols modulated on a second subcarrier frequency of the second set of subcarrier frequencies having a second symbol duration, wherein the first symbol duration is different than the second symbol duration;
a first transformer configured to transform the digitized radio signal from a time domain into a frequency domain, the first transformer producing a first transformed signal having a value for each frequency in the first set of subcarrier frequencies;
a first decoder configured to reconstruct digital information from output of the first transformer;
an inverse transformer configured to:
receive as input at least a part of the output of the first transformer representing a frequency range overlapping the second set of subcarrier frequencies, and
transform the input from the frequency domain back to the time domain;
a second transformer configured to transform output of the inverse transformer from the time domain to a frequency domain, the second transformer producing a second transformed signal having a value for each frequency in the second set;
a second decoder reconstructing digital information from the output of the second transformer.

17. The radio signal decoder as in claim 16, the first transformer operating on parts of the digitized radio signal having the first symbol duration in the time domain, the second transformer operating on parts of the digitized radio signal having the second symbol duration in the time domain, the radio signal decoder comprising a buffer so that output of inverse transformer on which the second transformer operates has the second symbol duration in the time domain.

18. The radio signal decoder as in claim 17, wherein the buffer is configured to receive from the first transformer and buffer the at least a part of output of the first transformer representing a frequency range overlapping the second set of subcarrier frequencies, the inverse transformer being configured to receive the input from the buffer.

19. The radio signal decoder as in claim 17, wherein the buffer is configured to receive and buffer output from the inverse transformer obtained by transforming the input of the inverse transformer from the frequency domain back to the time domain, the second transformer being configured to receive output of the inverse transformer from the buffer.

20. The radio signal decoder as in claim 16, wherein the first symbol duration is smaller than the second symbol duration.

* * * * *